March 10, 1953 P. P. WUERTZ Re. 23,631
BALE TENSIONING MECHANISM
Original Filed Oct. 3, 1947 3 Sheets-Sheet 1
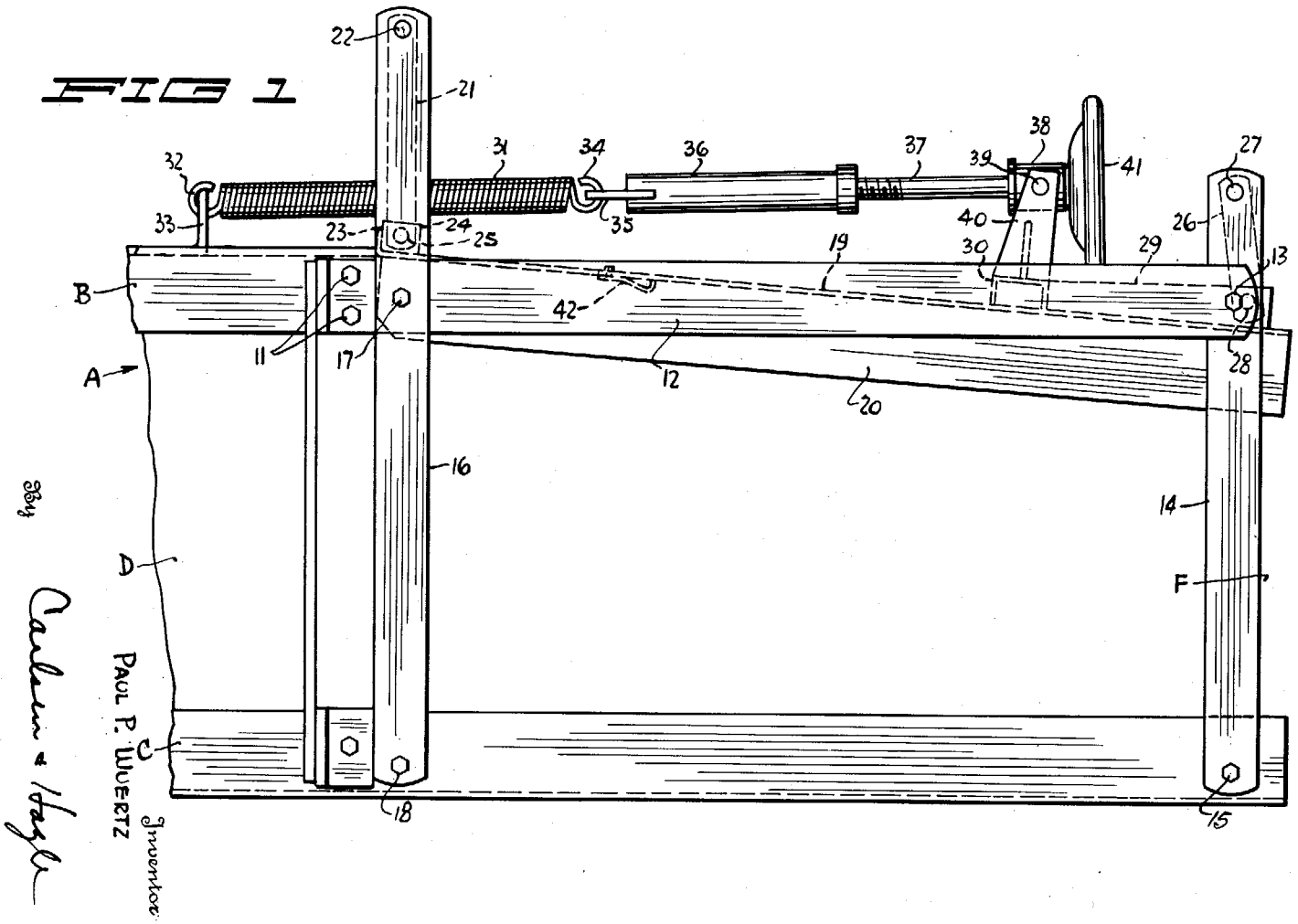
Inventor
PAUL P. WUERTZ
By Carlson & Hazle
Attorneys March 10, 1953 P. P. WUERTZ Re. 23,631
BALE TENSIONING MECHANISM
Original Filed Oct. 3. 1947 3 Sheets-Sheet 2
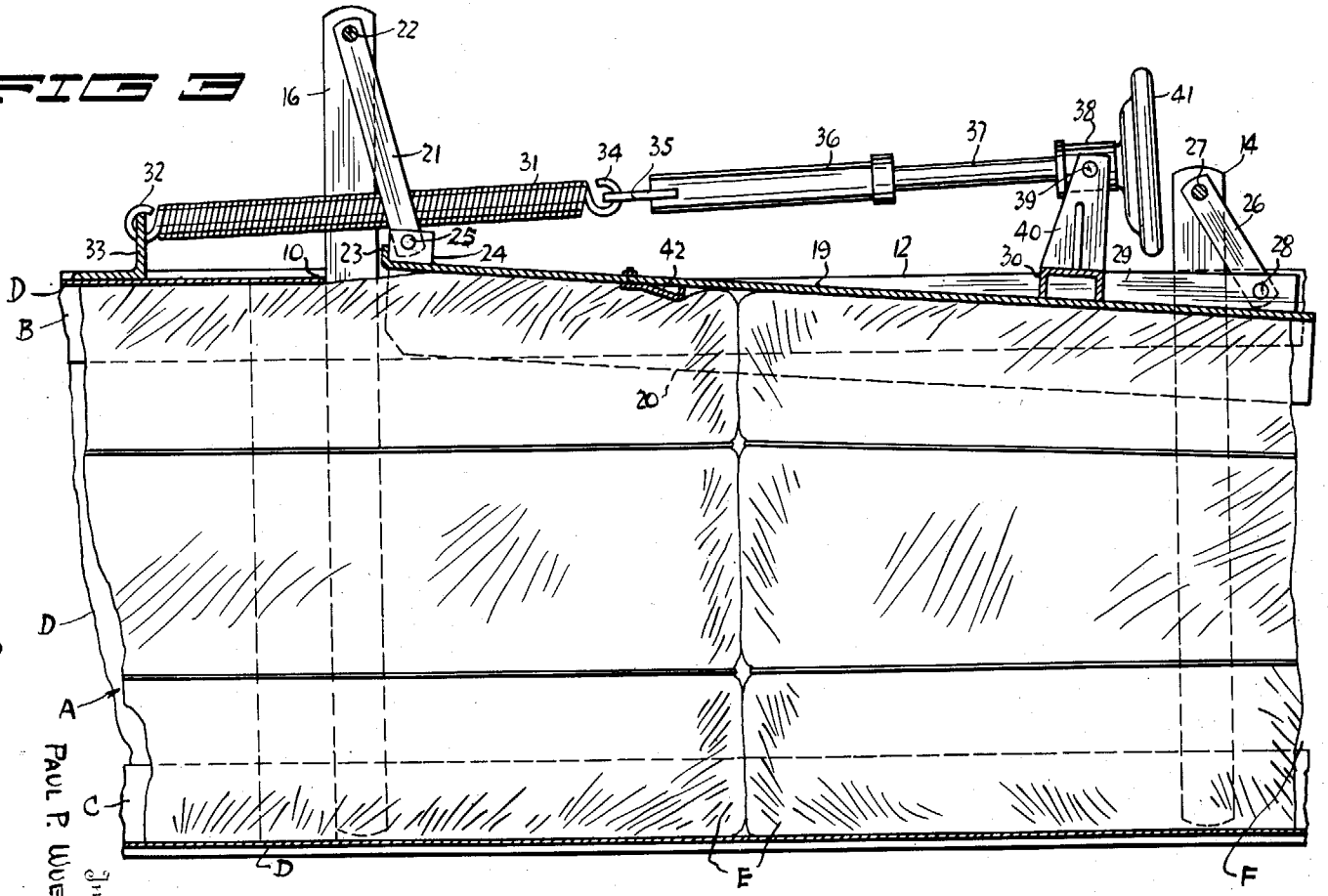
Inventor
PAUL P. WUERTZ
By Carlsen & Hagle
Attorneys March 10, 1953 P. P. WUERTZ Re. 23,631
BALE TENSIONING MECHANISM
Original Filed Oct. 3, 1947 3 Sheets-Sheet 3
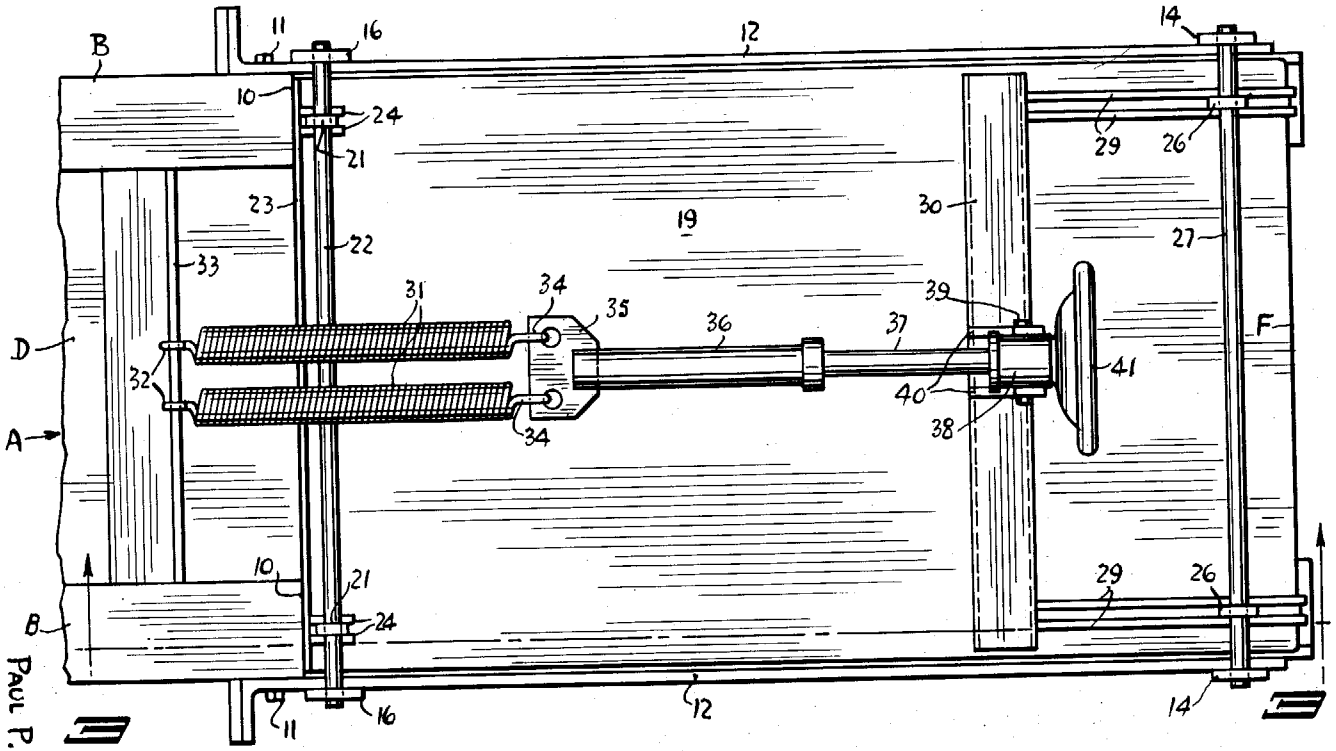
Inventor
PAUL P. WUERTZ
By Carlson + Hagler
Attorneys Reissued Mar. 10, 1953

Re. 23,631

UNITED STATES PATENT OFFICE 23,631

BALE TENSIONING MECHANISM

Paul P. Wuertz, Melrose, Minn., assignor, by mesne assignments, to Minneapolis-Moline Company, Hopkins, Minn., a corporation of Minnesota Original No. 2,608,930, dated September 2, 1952, Serial No. 777,773, October 3, 1947. Application for reissue October 22, 1952, Serial No. 316,332

4 Claims. (Cl. 100—192)

Matter enclosed in heavy brackets [ ] appears in the original patent but forms no part of this reissue specification; matter printed in italics indicates the additions made by reissue.

This invention relates to improvements in bale tensioning mechanisms for hay balers and like machines.

Such machines include a bale case having a chamber wherein the hay is compressed by the bale plunger, and tied either manually or automatically, before being ejected from the chamber. In practice each completed bale in succession acts as a head against which the next bale is gradually compressed and accumulated and thus, as is well understood in the art, the freedom with which each bale moves out through the baling chamber is controlling of the density of the bales that follow. For this reason, there is ordinarily provided a tension plate adjacent the delivery end of the baling chamber which plate is urged by adjustable tension springs against the bale to increase or decrease the frictional resistance to passing of the bale, as may be required.

In accordance with my present invention, I provide an improved tension plate, and suspension or mounting therefor, which is more sensitive and precise of adjustment than other plates to my knowledge and which is so constructed and arranged as to maintain the density from bale to bale more accurately the same, and which will prevent progressive choking due to changing characteristics of the material being baled, as all too frequently occurs in present day machines.

Another object is to provide a bale tensioning plate supported upon hanger links to move with the bale and with springs which resist such movement in order to hold the plate with tension against the bale. In accordance with my invention, however, the hanger links are so proportioned and so mounted that as the plate moves along with the bale the plate also moves in a direction away from the bale and toward a position at which the spring tension is relieved or actually released from the bale itself and transferred to the frame. In other words, the spring force of tension effective on the bale diminishes so that progressive choking of the baler is completely overcome.

Still a further object is to provide a bale tensioning plate swingably mounted upon links in such fashion as to be moved by the bale, as the bale travels toward the discharge end of the baler, and with the length of such links so proportioned that the end of the plate nearest said discharge will move away from the bale faster than the opposite end of the plate. The result is that the plate puts more tension on the bale being formed in the baling chamber than on the bale leaving the discharge opening and this is very desirable since it is the bale being formed that needs the tensioning control, rather than the bale which has been completed.

These and other more detailed and specific objects will be disclosed in the course of the following specification, reference being had to the accompanying drawings, in which—

Fig. 1 is a side elevation of the rear or delivery end of a hay baler baling chamber, showing my improved bale trimming plate in its inactive position.

Fig. 2 is a top plan view of the structure shown in Fig. 1.

Fig. 3 is a vertical, longitudinal section along the line 3—3 in Fig. 2, showing in this case the tensioning mechanism in operation, with bales in the baling chamber.

Referring now more particularly and by reference characters to the drawing, A designates generally a baling chamber of a conventional hay baler (not shown) and this chamber is rectangular in cross section and formed by a frame having longitudinal upper and lower parallel pairs of angles B and C joined by suitable bale case plates, indicated generally at D. The bales, indicated at E, as they are compressed and tied move toward and out through an open end F of the bale chamber and for convenience this will be referred to in this description as the rear end.

In accordance with my invention the upper frame angles B are cut off short at 10 while the upper and side bale case plates D terminate at the same point leaving the sides and top of the bale chamber open from this point rearwardly. Secured at 11 to the rear ends of the upper angles B are side bars 12 which extend rearwardly in parallelism and are secured at rear ends, at 13, to upright rear support bars 14. These bars 14 are secured at 15 to the rear ends of the lower frame angles C. Similar forward upright support bars 16 are secured at 18 to the angles C and at 17 to the side bars 12 and this assembly forms a rigid frame assembly which (Fig. 2) is spaced outward laterally from the sides of the bale chamber so that the space between the side bars 12 is equal to the overall width of the bale case or frame. The support bars 14 and 16 extend at upper ends some distance above the bale chamber, as clearly shown in Figs. 1 and 3.

Movably positioned in the rectangular space between the side bars 12 is a bale tensioning plate 19 of corresponding shape and proper size, having its sides turned downwardly in the form of flanges 20 for stiffening and to engage and guide the upper corners of the bales as they move rearwardly. The forward end of the tensioning plate 19 is swingably suspended by hanger arms or links 21, the upper ends of which are pivotally mounted upon a cross rod 22 extending through and between the upper ends of the forward support bars 16. The forward end of plate 19 is turned upwardly at 23, for transverse stiffening, and in the angle thus formed are welded or otherwise suitably secured spaced pairs of apertured lugs 24, between which the lower ends of the hanger arms 21 are pivoted, as indicated at 25. The rear end of the tensioning plate is similarly and swingably suspended by hanger arms or links 26 pivoted at their upper ends upon a cross rod 27 joining the upper ends of the rear support bars 14. The lower ends of the arms 26 are pivoted at 28 between transversely spaced pairs of ribs 29 which are secured to the upper rear part of the plate, extending rearwardly from a transverse bar 30 also secured to the plate. This arrangement is thus such that the tensioning plate 19 is supported for oscillating or swinging movements in generally horizontal and forward and rearward directions above and with respect to the baling chamber, all as will be understood.

The tensioning plate 19 is normally urged forward, to the position of Figs. 1 and 2 at which its forward end abuts the rear of the angles B, by a pair of heavy retractile coil springs 31 which are positioned above the plate. The forward ends of the springs 31 are attached at 32 to an angle 33 secured across the upper bale case angles B and C, and the rear ends of the springs are attached at 34 to a plate 35 secured to an interiorly threaded tube 36. A screw 37 is threaded into the tube 36 and is journaled rearwardly through a collar 38 pivoted at 39 between brackets 40 secured to and extending upwardly in spaced relation from the center of the cross bar 30. A hand wheel 41 is secured to the rear end of the screw 37 and by turning this wheel the tube 36 may be moved forwardly or rearwardly to respectively decrease or increase the effective tension of the springs 31.

Attention is called to the fact that the forward hanger arms 21 are much longer than the rear hanger arms 26, and further that the respective pivots for these arms are all so located that in the normal or inoperative position of the tensioning plate (Fig. 1) at which it is held by the springs 31, not only will the hanger arms hang substantially straight down, but the tensioning plate itself will slope rearwardly and hang lower at its rear end.

One (or more) of the usual bale chamber wedges 42 is secured across the underside of the tensioning plate for the usual purpose of restricting the passage of the bale.

In operation as a bale is formed and moved progressively rearward in the baling chamber it will move out beneath the tensioning plate 19, and due to the rearward slope thereof, there is an increasing constriction of the bale chamber so that the bale will be retarded in its passage, resulting in considerable friction upon the tensioning plate. Such friction has a tendency to impart movement to the tensioning plate, in the direction in which the bale travels, but this movement is opposed by the tension of the springs 31 which pull the plate in the opposite direction. Thus, there is an adjustable (by the hand wheel 41 which adjusts the [spring] *springs*) yieldable resistance set up against passing of the bale and this as usual regulates the density of successive bales as they are accumulated against each just completed bale, as will be understood.

As the plate 19 is moved rearwardly by the bale the plate also moves upwardly away from the bale and due to the shortness of the rear hanger links 26, plus the fact that these links at the outset angle downward and rearward rather than hang straight down, the rear end of the plate moves upward much more and much faster than its forward end.

As the plate so moves, the rear links 26 approach an alignment with the line of pull by the springs 31 and thus the springs will operate with decreasing leverage on the plate. In practice the rear links 26 may move up almost to horizontal positions and as they do the pull of the springs is more and more transmitted direct to the baler frame. As a result the springs operate with diminishing tension on the plate and in many cases the plate actually floats almost free of spring tension when a large, dense bale is going through. This effect prevents the progressive choking of the baler which is so common with machines where the spring tension against the bale continually and uniformly increases.

It will, of course, be understood that at the outset the effective spring tension will be directly exerted on the bales but as the plate begins to move and the springs are stretched, and as the links 26 move more and more toward the horizontal, the spring tension will be transferred more and more to the baler frame. Thus the action is just the opposite of the conventional action of previous bale tensioners in which the compressive effect on the bale rises continuously, and the succeeding bales are packed harder and harder, and choking inevitably results. Actual use of the mechanism under widely varying crop conditions has proven the soundness of the invention and it provides bales of uniform density and weight, without the necessity for continual adjustments of the spring tension.

It is to be noted also that as the rear end of the plate 19 moves upward and rearward the forward end has very little upward movement. Therefore this forward end retains contact with the bale ahead of the bale being ejected from the baler and actually more tension is placed on the bale being formed than on the bale leaving the discharge end of the machine. This is as it should be since it is the bale being formed that needs the tension and regulation of its density.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a baling machine, a frame having a bale chamber with an open rear end for delivering the bales, a bale tensioning plate above the bale chamber for engaging the bales as they pass out the rear end thereof, supports on the frame, upright front and rear suspension arms for the plate, the upper ends of the arms being pivoted to the supports and the lower ends pivoted to the plate whereby the plate may swing rearward and upward by contact with a passing bale, the rear arms being shorter than the front arms, and at least one coil spring arranged above the plate with its axis lengthwise of the bale chamber and connected at its forward end to the frame and at its rear end to the plate forward of the rear arms.

2. For a baler having a frame with a baling chamber through which the bales move as they are compressed and discharged from the baler, bale tensioning mechanism of the character described comprising in combination, a tensioning plate swingably supported lengthwise at one side of the baling chamber to frictionally engage the adjacent sides of passing bales, links pivotally connected to the frame and to the opposite ends of the plate to swingably support the plate *for movement by the bales as they pass and so that the plate* in swinging moves outward from the bales, the links nearest the discharge end of the chamber being shorter than those at the opposite end and so located that the plate angles inwardly into the chamber at this end, a coil spring arranged with its axis lengthwise of the plate and connected between the frame and plate to resist movement of the plate by the bales, and the spring and said shorter links being so positioned with respect to each other that these links will approach alignment with the axis of the spring as the plate swings outward and thereby the effective force of the spring will operate with diminishing leverage upon the plate.

3. For a baler having a frame with a baling chamber through which the bales move as they are compressed and discharged from the baler, bale tensioning mechanism of the character described comprising in combination, a tensioning plate swingably supported lengthwise at one side of the baling chamber to frictionally engage the adjacent sides of passing bales, links pivotally connected to the frame and to the opposite ends of the plate to swingably support the plate for movement by the bales as they pass and so that the plate in swinging moves outward from the bales, the links nearest the discharge end of the chamber being shorter than those at the opposite end and so located that the plate angles inwardly into the chamber at this end, and an elongated coil tension spring stretched between the plate and the baler frame in such position that the included angle between the line along which the force of the spring is transmitted to the plate and the shorter links will increase as the plate swings outward from the bales to thereby reduce the effective tension of the spring on the plate.

4. For a baler having a frame with a baling chamber through which the bales move as they are compressed and discharged from the baler, bale tensioning mechanism of the character described comprising in combination, a tensioning plate swingably supported lengthwise in one side of the chamber to frictionally engage the corresponding sides of the bales and said plate being angularly positioned with reference to the path of the bales with the end of the plate nearest the discharge end of the chamber located further inward in the chamber than the opposite end of the plate, links pivotally connected between the frame and the opposite ends of the plate whereby the plate may move with the passing bales and at the same time swing outward, and an elongated retractile coil spring stretched between the frame and plate to yieldably resist such movement of the plate and located in such position that the links at the innermost end of the plate will approach alignment with the line along which the spring pulls on the plate to thereby reduce the effective pull on the plate and transfer the pull of the spring through these links to the baler frame as the plate swings outward.

PAUL P. WUERTZ.

REFERENCES CITED

The following references are of record in the file of this patent or the original patent:

UNITED STATES PATENTS

| Number | Name | Date |
|---|---|---|
| 1,394,458 | Whitney | Oct. 18, 1921 |
| 1,756,988 | Nichols | May 6, 1930 |
| 2,389,510 | Hitchcock | Nov. 20, 1945 |
| 2,494,033 | Burkett | Jan. 10, 1950 |
| 2,613,590 | Graybill | Oct. 14, 1952 |